(12) United States Patent
Walton et al.

(10) Patent No.: US 7,759,967 B2
(45) Date of Patent: Jul. 20, 2010

(54) GENERAL PURPOSE PIN MAPPING FOR A GENERAL PURPOSE APPLICATION SPECIFIC INTEGRATED CIRCUIT (ASIC)

(75) Inventors: Derek T. Walton, Bolton, MA (US); Carl M. Mikkelsen, Wayland, MA (US); Michael J. Schaffstein, Waltham, MA (US); Robert J. DeMattia, Northborough, MA (US)

(73) Assignee: Conexant Systems, Inc., Newport Beach, CA (US)

( * ) Notice: Subject to any disclaimer, the term of this patent is extended or adjusted under 35 U.S.C. 154(b) by 1321 days.

(21) Appl. No.: 11/031,891

(22) Filed: Jan. 7, 2005

(65) Prior Publication Data

US 2005/0232255 A1    Oct. 20, 2005

Related U.S. Application Data

(60) Provisional application No. 60/535,228, filed on Jan. 9, 2004.

(51) Int. Cl.
*H03K 19/173* (2006.01)
(52) U.S. Cl. ............................... 326/38; 326/41; 326/39
(58) Field of Classification Search .............. 326/38–41
See application file for complete search history.

(56) References Cited

U.S. PATENT DOCUMENTS

| | | | | |
|---|---|---|---|---|
| 6,114,878 A | * | 9/2000 | Loughmiller et al. | 326/101 |
| 6,417,695 B1 | * | 7/2002 | Duesman | 326/47 |
| 6,456,099 B1 | * | 9/2002 | Eldridge et al. | 324/754 |
| 6,667,895 B2 | * | 12/2003 | Jang et al. | 365/63 |
| 6,781,406 B2 | * | 8/2004 | Emberling et al. | 326/38 |
| 6,991,947 B1 | * | 1/2006 | Gheewala | 438/15 |
| 7,230,450 B2 | * | 6/2007 | Kurts et al. | 326/38 |
| 7,504,856 B2 | * | 3/2009 | Kurts et al. | 326/38 |
| 2002/0113619 A1 | * | 8/2002 | Wong | 326/41 |
| 2003/0112031 A1 | * | 6/2003 | Agrawal et al. | 326/41 |

* cited by examiner

*Primary Examiner*—Vibol Tan
(74) *Attorney, Agent, or Firm*—John R. Thompson; Stoel Rives LLP

(57) ABSTRACT

Disclosed herein are various embodiments of an application specific integrated circuit (ASIC). The ASIC includes a plurality of functional units. Each functional unit may include a plurality of connections. The ASIC may also include a plurality of input and/or output pins configured to couple the ASIC to a circuit board. A programmable client may be associated with each pin, and each programmable client may be programmed to selectively connect the pin with which it is associated to one of the plurality of connections of one of the plurality of functional units. In various embodiments, the programmable client may be embodied as a multiplexer or a crossbar switch. Further, the programmable client may be programmed using any of boot firmware, hardware jumpers, and/or non-volatile programming registers.

9 Claims, 5 Drawing Sheets

ONE PIN PER FUNCTIONAL CONNECTION $C_1 F_1 \longrightarrow P_1$ $C_2 F_1 \longrightarrow P_2$ $C_3 F_1 \longrightarrow P_3$ $C_1 F_2 \longrightarrow P_4$ $C_2 F_2 \longrightarrow P_5$ $C_1 F_3 \longrightarrow P_6$ $C_2 F_3 \longrightarrow P_7$ $C_3 F_3 \longrightarrow P_8$ $C_4 F_3 \longrightarrow P_9$

FIG. 2

HEIRARCHY OF FUNCTIONAL UNITS.
F2 AND F3 CAN BE PROGRAMMED TO PASS
CONNECTIONS THROUGH TO PINS.

GENERAL PURPOSE PIN MAPPING FOR A GENERAL PURPOSE APPLICATION SPECIFIC INTEGRATED CIRCUIT (ASIC)

REFERENCE TO PENDING PRIOR PATENT APPLICATION

This patent application claims benefit of pending prior U.S. Provisional Patent Application Ser. No. 60/535,228, filed Jan. 9, 2004 by Derek T. Walton et al. for GENERAL PURPOSE PIN MAPPING.

The above-identified patent application is hereby incorporated herein by reference.

FIELD OF THE INVENTION

This invention relates to office automation products in general, and more particularly to printers, fax machines, scanners, copiers and the like. Even more particularly, this invention relates to the integration of formerly separate functions into single devices such as those sometimes referred to as MFPs (Multi-Functional-Peripherals), and the integration of multiple functions into a single ASIC (Application Specific Integrated Circuit) such as those produced by Oasis Semiconductor, Inc. of Waltham, Mass.

BACKGROUND OF THE INVENTION

The Problem of Limited Pin Connections

When designing general purpose SoC (System on a Chip) ASIC (Application Specific Integrated Circuit) devices, there is usually one resource that is most heavily constrained: the pins.

More particularly, although silicon gate densities have increased dramatically over the years, following the now-famous Moore's Law, integrated circuit packaging has not developed at the same pace. Among other things, limitations of PCB (Printed Circuit Board) fabrication, mechanical device handling and package size combine to limit the number of physical connections ("pins") which it is economically viable to provide between the silicon die and the external system.

Some packaging techniques such as BGA (Ball Grid Array) allow the number of exposed connections to be higher, but only by employing both a more expensive IC (Integrated Circuit) package, and a more expensive PCB.

The constraints over pin resources are particularly difficult to resolve in a general purpose SoC ASIC component, i.e., a general purpose component which can subsequently be custom configured to perform one or more specific functions. More particularly, if the function of the ASIC chip is "frozen" at the time the chip is designed, the individual pin connections can be committed, the logic of the ASIC can be developed, and the external connections can be made accordingly. In such a pre-determined ASIC device, there is no need to alter the configuration of the ASIC to meet still-to-be-determined needs. For a more general purpose SoC ASIC component, however, the required connections cannot be determined in advance, since it is not yet clear what the specific functions of the general purpose ASIC chip will be, so it is necessary to allow the individual pin connections to be assigned at a later time.

A general purpose SoC ASIC typically includes many different functional units such as, for example, pixel input, pixel output, CCD timing, parallel port, various serial interfaces, general purpose I/O, peripheral bus, etc. These functional units F may be digital and/or analog. Each functional unit F typically has a plurality of connections C associated with it. Taken together, there are many independently identifiable connections possible between the functional units F and the external circuitry (see FIG. 1). The chip itself, however, typically only provides P usable pins (see also FIG. 1).

In this respect, it should be appreciated that a connection is more than a simple wire, or a single signal. A connection includes all information necessary to control a pin for a function. Typically, a connection will include the value signals from the function unit to the pin, and from the pin to the function unit. These may include, but are neither limited to nor required to include:

(i) the current signal present on the pin (for example, to read the pin state);
(ii) indication to the pin if it should be driving a signal from the SoC to the external circuitry (drive enable); and
(iii) indication of the signal that should be driven, if the "drive enable" is set true.

Similarly, a connection is not constrained to be a binary digital signal, as either analog signals or multi-valued digital signals are compatible (and covered by this invention).

Prior Approaches

(i) One Chip Per Application, One Application Per Chip

One prior solution has been to construct a new, unique ASIC component for each new application. In this arrangement, $C_1F_1$ (i.e., connection 1 of functional unit 1) is "hard wired" to $P_1$ (i.e., pin 1); $C_2F_1$ (i.e., connection 2 of functional unit 1) is hard wired to $P_2$ (i.e., pin 2), etc. (see FIG. 2). The name ASIC itself (i.e., Application Specific Integrated Circuit) suggests that this unique, permanent pin mapping approach is the most common solution in the chip design industry.

However, where an ASIC uses such hard wired pin mapping, a new chip must be designed and fabricated for each new application. Given the substantial fixed costs associated with producing each unique chip, it is generally not desirable to develop many similar but different chips.

(ii) Selective Overrides

Some previous general purpose SoC ASICs have solved the problem of a limited number of pins by using the same pins for several different purposes. This is accomplished by permitting the pin associations to be changed according to use, using a system of selective overrides, implemented either by firmware or by some other method.

More particularly, for the Oasis DigiColor-2 chip manufactured by Oasis Semiconductor, Inc. of Waltham, Mass., pin reassignment is effected by providing a complex hierarchy of override functions (see FIG. 3). For example, unless overridden, a pin might be a general purpose I/O pin, controlled from the GP (General Purpose) functional unit (e.g., functional unit $F_1$). If the application requires a parallel port, then the PP (Parallel Port) functional unit (e.g., functional unit $F_2$) is enabled, and that pin is no longer controlled from the GP functional unit, but is instead controlled from the PP functional unit. The PP functional unit may need to control a large set of pins, some of which may not be needed, so there may be a further mechanism to make some of the pins controlled by the PP functional unit revert to a general purpose I/O function, although still controlled from the PP functional unit.

(iii) Problem Of Overrides

This complex system of overrides, even when simplified as described above, can be difficult for a firmware developer to program correctly.

Even when it is programmed correctly, overrides can result in unexpected behavior and unnecessary, poorly structured code changes. For example, if a particular pin is used by one firmware code module as a GP pin, the way the GP pin is used and programmed will depend on whether an unrelated firmware code module enables the parallel port. If the parallel port is not enabled, the GP pin is controlled one way with one set of internal registers; if parallel port is enabled, the pin is controlled through a different set of registers.

A problem with this approach is that one firmware code module must be changed in accordance with the operation of an unrelated firmware code module. Although this can be done, it violates widely-accepted principles of structured design.

SUMMARY OF THE INVENTION

To overcome the foregoing limitations in prior art chip design, including the problems of pin shortages and selective overrides, the present invention provides a novel way to determine the function of the chip's pins.

More particularly, rather than placing the functional units in control of the pin usage with a series of override conditions, with the present invention, each pin is independently programmable to selectively determine its function and connection to internal functional units.

More particularly, in one form of the invention, there is provided a general purpose ASIC comprising:
  a plurality of functional units each having a plurality of connections;
  a plurality of pins; and
  an interface for connecting selected connections of selected functional units to selected pins.

In another form of the invention, there is provided a method for configuring a general purpose ASIC comprising:
  providing a general purpose ASIC comprising:
    a plurality of functional units each having a plurality of connections;
    a plurality of pins; and
    an interface for connecting selected connections of selected functional units to selected pins; and
  configuring said interface so as to connect selected connections of selected functional units to selected pins.

In another form of the invention, there is provided a general purpose ASIC comprising:
  a plurality of functional units each having a plurality of connections;
  a plurality of pin units, each pin unit being selectively connectable to a selected connection of a selected functional unit.

In another form of the invention, there is provided a general purpose ASIC comprising:
  a plurality of functional units each having a plurality of connections; and
  a plurality of pins;
  characterized in that:
    said general purpose ASIC further comprises an interface for connecting selected connections of selected functional units to selected pins.

In another form of the invention, there is provided a general purpose ASIC wherein each pin is programmable to connect with a connection of a functional unit.

In another form of the invention, there is provided method for pin mapping in a general purpose ASIC, comprising:
  programming each pin to connect with a connection of a functional unit.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIG. 2 is a schematic illustration showing a prior art ASIC chip design utilizing the so-called "one pin per function connection" approach;

DETAILED DESCRIPTION OF THE PREFERRED EMBODIMENTS

Overview

Figure 1:
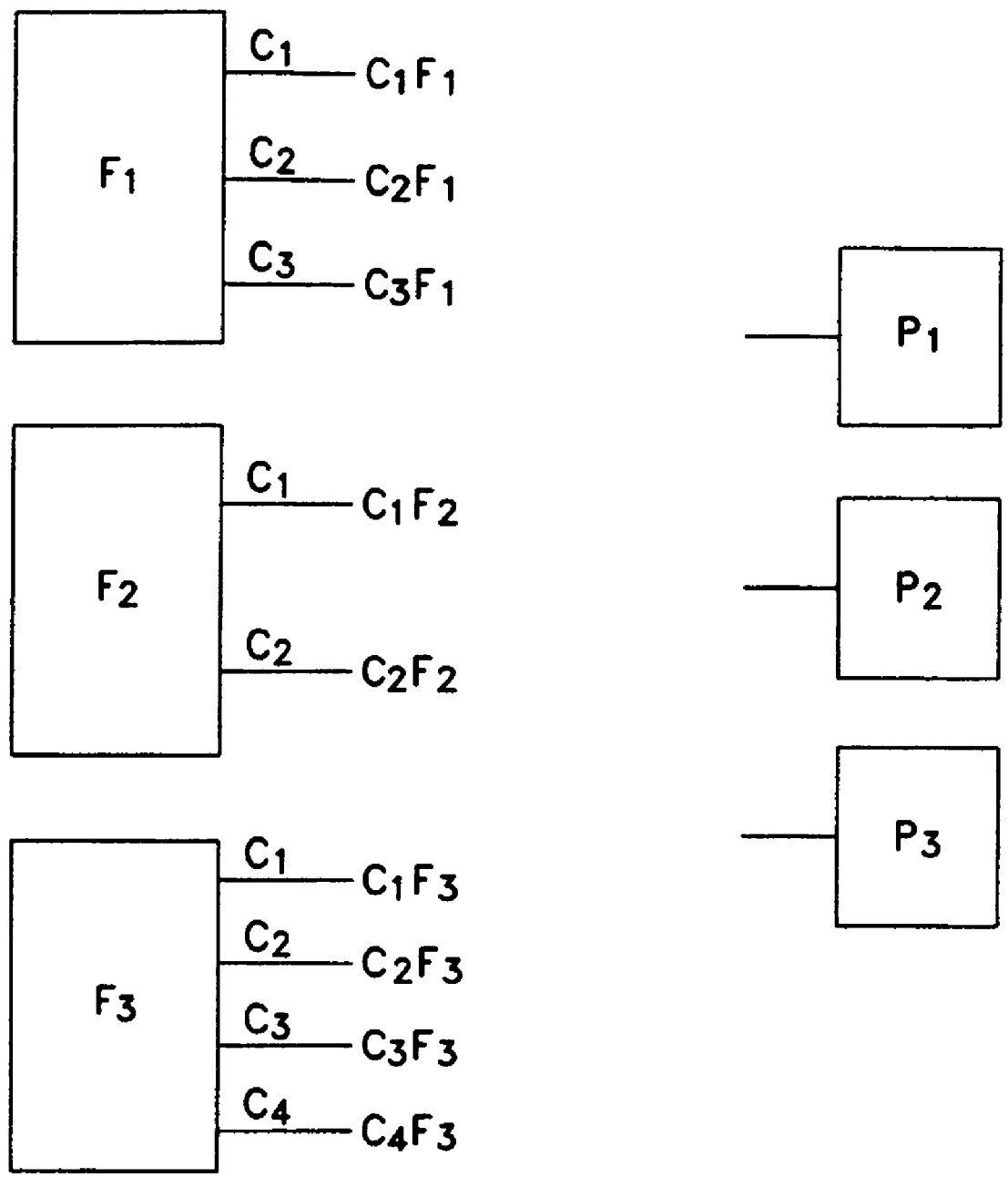
FIG. 1 is a schematic illustration showing functional units with their respective connections.
Figure 3:
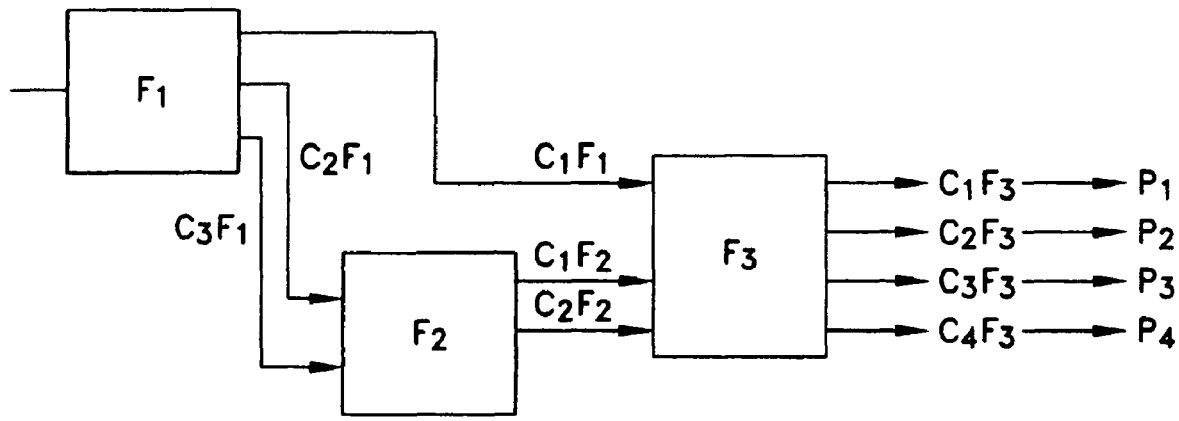
FIG. 3 is a schematic view showing a prior art ASIC chip design utilizing a hierarchy of override functions.
Figure 4:
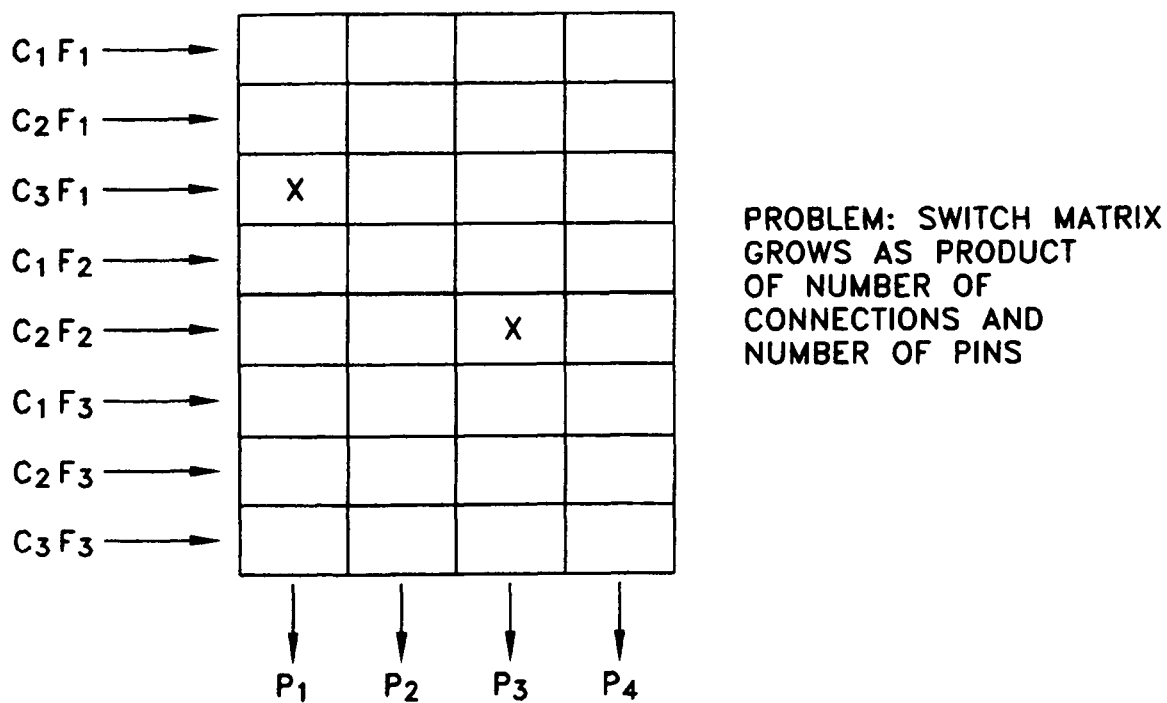
FIG. 4 is a schematic view showing a general purpose pin mapping approach which uses a crossbar to match a larger set of functional unit connections to a smaller set of pins.

In one preferred form of the present invention, each pin P of the chip is programmable so as to enable it to be connected with any of the C connections of functional units F (see FIG. 4).

There are many possible ways to achieve these programmable interconnections. By way of example but not limitation, the programmable interconnections may be effected through the use of a large multiplexer, a crossbar switch, or another internal bus structure. In this way, any functional unit connection $C_X F_Y$ can be provided through any pin $P_I$. Therefore, when the SoC ASIC system is configured during chip preparation by one of many possible means (such as, but not limited to, boot firmware, hardware jumpers, or non-volatile programming registers), each pin $P_I$ is assigned a specific functional unit connection $C_X F_Y$. The benefit of such a configuration is that the functional units are not connected to the pins in a pre-determined manner. Instead, the pins are selectively connectable to the functional units during chip preparation.

Thus, the present invention provides a general purpose pin mapping arrangement which permits any pin to be selectably connected to any functional unit connection. As a result, a general purpose SoC ASIC device can be incorporated in a chip package even where the ASIC chip provides many more functional unit connections than there are pins for the chip package.

In one preferred construction, and looking now at FIG. 4, each pin P of the chip is programmable so as to be connectable with any of the C connections of functional units F. However, while this embodiment of the invention provides maximum flexibility, given the current state of the art of IC (Integrated Circuit) fabrication, implementing the fully general connection scheme shown in FIG. 4 may require more silicon chip area than is economically justifiable.

Therefore, in another preferred embodiment of the present invention, rather than permitting the every connection C to connect with every pin P, a different arrangement may be used. More particularly, in this embodiment, a selected subset of the connections C from one or more functional units F is connected to each pin P using a programmable client (see FIG. 5). In some circumstances, this embodiment may be more economically justifiable, since it does not require as much silicon chip area, but it is characterized with the most of the same benefits.

Figure 5:
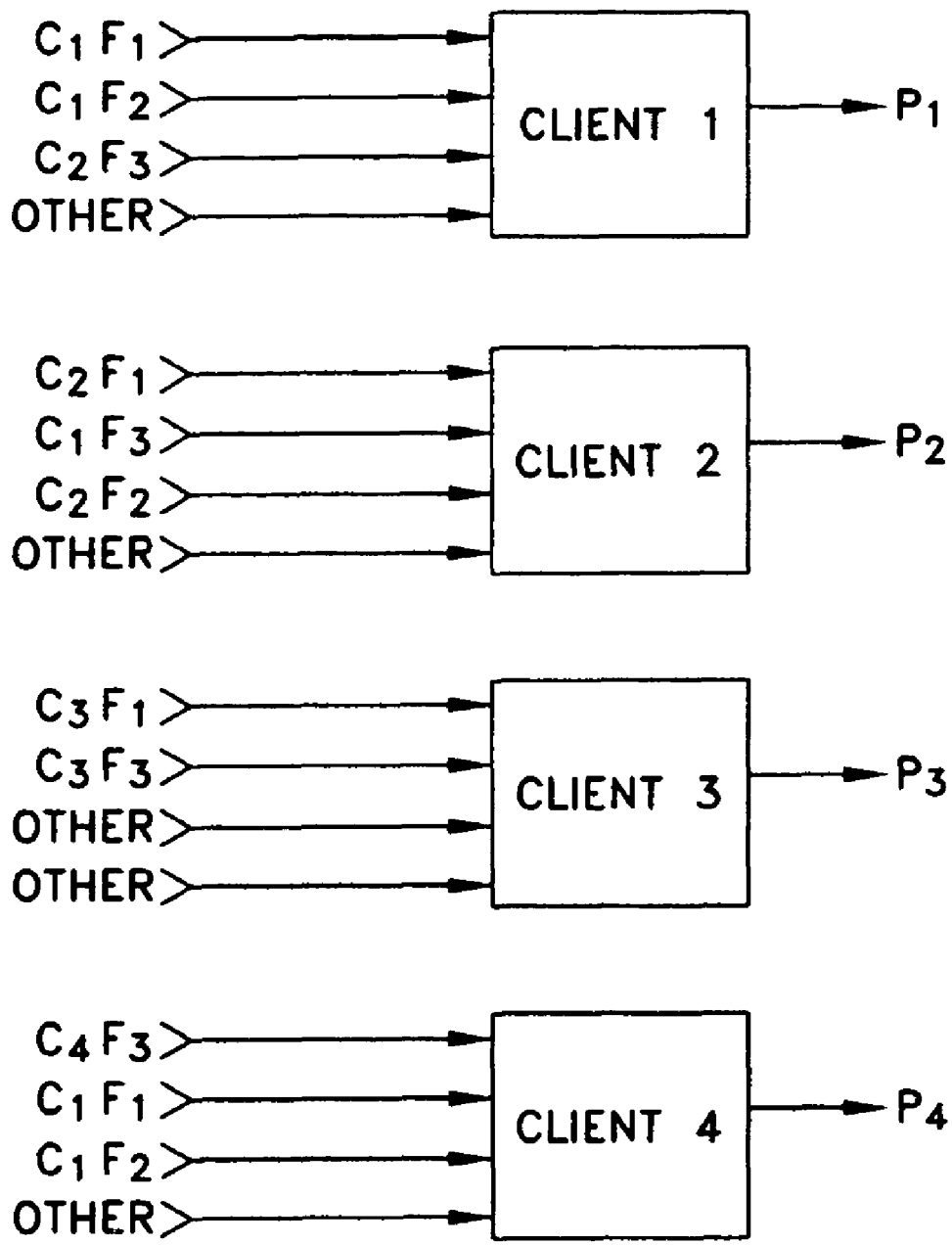
FIG. 5 is a schematic view showing how a plurality of client cells may each be programmed to connect one of the functional unit connections to a pin.

More particularly, in this embodiment of the invention, each pin P is programmed to connect with up to four of the connections $C_X F_Y$, as shown in FIG. 5. One of these connections is preferably a general purpose GP functional unit. The other three connections are chosen when the chip is designed. This arrangement provides substantial flexibility to the ASIC component while minimizing cost. By limiting the possible connections of each pin to four functional units, the logic and cost is significantly reduced from the general case (i.e., where each pin of the chip may be programmed to connect it with any of the C connections of any of the functional unit F).

This novel construction gives great flexibility to the ASIC system.

For example, one of the advantages of the present invention is that the desired portions of a functional unit can be easily connected, while the portions that are not needed can be left unconnected.

Another advantage of the present invention is that the aforementioned pin reassignment can be used to render a PCB layout more flexible, i.e., because the physical pins can be reassigned as needed, the chip can be reconfigured if needed to match physical constraints of the circuit board.

Yet another benefit of the present invention is that where noise-producing signals may be located near sensitive pins, the pin assignments can be reconfigured so that the pins in question are moved away from the noise-producing signals.

Still another benefit of the present invention is that more than one pin can be used to output a single signal, thereby increasing the electronic drive capability.

The benefits described above include only some examples of the many benefits which may be achieved with the present invention.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. An ASIC configured to couple to a circuit board, the ASIC comprising:
   a plurality of functional units each having a plurality of connections;
   a plurality of output pins configured to couple the ASIC to a circuit board;
   a plurality of output programmable clients, each of said plurality of output pins associated with a corresponding output programmable client, and each output programmable client comprising:
      an output associated with said output pin, and
      a plurality of inputs, said inputs associated with a subset of said plurality of connections of said plurality of functional units;
   wherein each output programmable client is programmable to selectively connect one of said plurality of inputs to said output;
   a plurality of input pins configured to couple the ASIC to the circuit board;
   a plurality of input programmable clients, each of said plurality of input pins associated with a corresponding programmable client, and each input programmable client comprising:
      an input associated with said input pin, and
      a plurality of outputs, said outputs associated with a subset of said plurality of connections of said plurality of functional units; and
   wherein each input programmable client is programmable to selectively connect one of said plurality of outputs to said input.

2. An ASIC according to claim 1 wherein each programmable client is selected from the group consisting of multiplexers, and crossbar switches.

3. An ASIC according to claim 1 wherein each programmable client is programmed by one selected from the group consisting of boot firmware, hardware jumpers and non-volatile programming registers.

4. An ASIC according to claim 1 wherein each programmable client is associated with four functional unit connections.

5. An ASIC according to claim 1 wherein each pin unit is independently programmable so as to selectively determine its connection to a particular connection of a particular functional unit.

6. A method for pin mapping in an ASIC configured to couple to a circuit board, the ASIC comprising:
   providing an ASIC comprising:
      a plurality of functional units each having a plurality of connections;
      a plurality of output pins configured to couple the ASIC to a circuit board;
      a plurality of output programmable clients, each of said plurality of output pins associated with a corresponding output programmable client, and each output programmable client comprising:
         an output associated with said output pin, and
         a plurality of inputs, said inputs associated with a subset of said plurality of connections of said plurality of functional units;
      wherein each output programmable client is programmable to selectively connect one of said plurality of inputs to said output;
      a plurality of input pins configured to couple the ASIC to a circuit board;
      a plurality of input programmable clients, each of said plurality of input pins associated with a corresponding input programmable client, and each input programmable client comprising:
         an input associated with said input pin, and
         a plurality of outputs, said outputs associated with a subset of said plurality of connections of said plurality of functional units; and
   programming each output programmable client to selectively connect one of said plurality of inputs to said output; and programming each input programmable client to selectively connect one of said plurality of outputs to said input.

7. A method according to claim 6 wherein each programmable client is selected from the group consisting of multiplexers and crossbar switches.

8. A method according to claim 6 wherein each programmable client is programmed by one selected from the group consisting of boot firmware, hardware jumpers and non-volatile programming registers.

9. A method according to claim 6 wherein each programmable client is associated with four functional unit connections.

* * * * *

UNITED STATES PATENT AND TRADEMARK OFFICE
CERTIFICATE OF CORRECTION

| | |
|---|---|
| PATENT NO. | : 7,759,967 B2 |
| APPLICATION NO. | : 11/031891 |
| DATED | : July 20, 2010 |
| INVENTOR(S) | : Walton et al. |

It is certified that error appears in the above-identified patent and that said Letters Patent is hereby corrected as shown below:

Column 3, Lines 40-41 reads, "...a general purpose ASIC comprising: providing a general purpose ASIC comprising:..." which should read, "...a general purpose ASIC comprising:..."

Column 4, Line 1 reads, "...there is provided method for pin mapping..." which should read, "...there is provided a method for pin mapping..."

Column 5, Line 2 reads, "...rather than permitting the every connection..." which should read, "...rather than permitting every connection..."

Signed and Sealed this

Seventh Day of December, 2010

David J. Kappos
*Director of the United States Patent and Trademark Office*